US012528390B2

(12) United States Patent
Zhou et al.

(10) Patent No.: US 12,528,390 B2
(45) Date of Patent: Jan. 20, 2026

(54) SAFETY SEAT

(71) Applicant: NINGBO BABY FIRST BABY PRODUCTS CO., LTD., Zhejiang (CN)

(72) Inventors: Xiaolin Zhou, Zhejiang (CN); Gang Yang, Zhejiang (CN); Yi Guo, Zhejiang (CN)

(73) Assignee: NINGBO BABY FIRST BABY PRODUCTS CO., LTD., Ningbo (CN)

( * ) Notice: Subject to any disclaimer, the term of this patent is extended or adjusted under 35 U.S.C. 154(b) by 231 days.

(21) Appl. No.: 18/028,561

(22) PCT Filed: Jun. 4, 2021

(86) PCT No.: PCT/CN2021/098222
§ 371 (c)(1),
(2) Date: Mar. 27, 2023

(87) PCT Pub. No.: WO2022/110751
PCT Pub. Date: Jun. 2, 2022

(65) Prior Publication Data
US 2023/0356632 A1   Nov. 9, 2023

(30) Foreign Application Priority Data

Nov. 30, 2020 (CN) .......................... 202011380172.8

(51) Int. Cl.
*B60N 2/28* (2006.01)
(52) U.S. Cl.
CPC ......... *B60N 2/2821* (2013.01); *B60N 2/2875* (2013.01)

(58) Field of Classification Search
CPC ... B60N 2/2821; B60N 2/2869; B60N 2/2875
See application file for complete search history.

(56) References Cited

U.S. PATENT DOCUMENTS

| 8,459,739 B2* | 6/2013 | Tamanouchi | B60N 2/2827 |
| | | | 297/256.16 |
| 10,322,651 B2* | 6/2019 | Hutchinson | B60N 2/2806 |

(Continued)

FOREIGN PATENT DOCUMENTS

| CN | 109532586 A | 3/2019 |
| CN | 210337660 U | 4/2020 |

OTHER PUBLICATIONS

International Search Report of PCT Patent Application No. PCT/CN2021/098222 issued on Sep. 9, 2021.

*Primary Examiner* — Philip F Gabler (57) ABSTRACT

A safety seat, comprising a seat structure and a base, the seat structure and the base being rotatably connected. The seat structure comprises a connecting base, an adjusting assembly and a seat body. The seat body is mounted on the connecting base. The adjusting assembly is mounted on the seat body and is selectively connected to the connecting base. When the adjusting assembly is disengaged from the connecting base, the seat body can be disconnected from the connecting base and the base such that the rotation angle of the seat structure relative to the base can be adjusted and the pitch angle of the seat body relative to the connecting base can be adjusted. The rotation angle and the pitch angle can be adjusted simultaneously in a single operation. The convenience of operation is improved and the comfort for a child during use is also improved.

6 Claims, 9 Drawing Sheets

(56) References Cited

U.S. PATENT DOCUMENTS

| | | | |
|---|---|---|---|
| 10,688,892 B2* | 6/2020 | Anderson | B60N 2/2821 |
| 11,260,779 B2* | 3/2022 | Brunick | B60N 2/2875 |
| 2006/0170262 A1* | 8/2006 | Gold | B60N 2/2875 |
| | | | 297/256.12 |
| 2019/0135142 A1* | 5/2019 | Jung | B60N 2/2821 |
| 2020/0276920 A1* | 9/2020 | Liu | B60N 2/2869 |

* cited by examiner

SAFETY SEAT

TECHNICAL FIELD

The present invention relates to the technical field of child seats, and in particular, to a safety seat.

BACKGROUND ART

A safety seat as a seat tied to a vehicle seat is a vehicle accessory device having a binding protection function, and is a seat that is only for a child to sit in and can bind the child to ensure safety of the child in the case of a vehicle accident.

Currently, in a safety seat in the prior art, it is inconvenient to adjust the pitch angle and the rotation angle of the safety seat during use by a child, resulting in poor comfort.

SUMMARY OF THE INVENTION

An objective of the present invention is to provide a safety seat, which can adjust the pitch angle and the rotation angle of the safety seat simultaneously, and improve the comfort for a child during use.

Embodiments of the present invention can be implemented as follows:

in an optional embodiment of the present invention, a safety seat is provided, the safety seat comprising: a seat structure and a base, wherein the seat structure and the base are rotatably connected, and the seat structure comprises a connecting base, an adjusting assembly and a seat body; the seat body is mounted on the connecting base, and the adjusting assembly is mounted on the seat body and is selectively connected to the connecting base; and when the adjusting assembly is disengaged from the connecting base, the seat body can be disconnected from the connecting base and the base such that the rotation angle of the seat structure relative to the connecting base is adjusted and the pitch angle of the seat body relative to the connecting base is adjusted.

In an optional embodiment of the present invention, the adjusting assembly comprises a connecting portion, a fixing member and an elastic member, wherein one end of the elastic member is connected to the connecting base, the other end thereof is connected to the fixing member, the fixing member is fixed to the connecting portion, the fixing member selectively matches the connecting base, the connecting portion is configured to drive the fixing member to move away from the connecting base under the action of an external force, so that the fixing member is disengaged from the connecting base, and the seat body can adjust the pitch angle of the seat body relative to the connecting base and the rotation angle of the seat structure relative to the base; and the elastic member drives the fixing member to move close to the connecting base when the external force is removed, so that the fixing member matches the connecting base, and the seat body is fixedly connected to the connecting base.

In an optional embodiment of the present invention, the fixing member comprises a first fixing portion, a second fixing portion is arranged on the connecting base, and the first fixing portion selectively matches the second fixing portion; and when an external force is applied to the connecting portion, the first fixing portion is disengaged from the second fixing portion, and when the external force is removed, the first fixing portion matches the second fixing portion.

In an optional embodiment of the present invention, the fixing member comprises a first guide portion, the adjusting assembly further comprises a connecting housing, the connecting housing is fixedly connected to the connecting base, a second guide portion is arranged on the connecting housing, the first guide portion matches the second guide portion, and when the external force is applied to the connecting portion, the first guide portion slides in an extension direction of the second guide portion, so that the first fixing portion moves away from the second fixing portion, and is disengaged from the second fixing portion.

In an optional embodiment of the present invention, the second guide portion is arranged obliquely.

In an optional embodiment of the present invention, a fixing member is arranged on the connecting base, a clamping member is further arranged on the seat body, the fixing member is connected to the clamping member, and the clamping member is selectively fixed to the base; when the adjusting assembly is disengaged from the connecting base, the fixing member can drive the clamping member to move relative to the connecting base, so that the clamping member is disengaged from the base, and the seat structure is rotatable relative to the base, and adjusts the pitch angle of the seat body relative to the connecting base.

In an optional embodiment of the present invention, the clamping member comprises a positioning portion and a clamping portion, the base is further provided with a clamping groove, the positioning portion matches the fixing member, the positioning portion is fixedly connected to the clamping portion, and the fixing member can drive the clamping portion to move in a direction close to or away from the clamping groove by means of the positioning portion, so that the clamping portion matches or is disengaged from the clamping groove.

In an optional embodiment of the present invention, the positioning portion comprises an elastic portion and an abutting portion, wherein one end of the elastic portion is connected to the clamping portion, the other end thereof is connected to the abutting portion, and the abutting portion matches the clamping member.

In an optional embodiment of the present invention, the fixing member comprises a fixing plate and a plurality of stop portions spaced on the fixing plate, and a positioning groove is formed between two adjacent stop portions; when the clamping member abuts against the stop portions, the clamping member is disconnected from the connecting base; and when the clamping member matches the positioning groove, the clamping member matches the base.

In an optional embodiment of the present invention, each of the stop portions has an obliquely arranged guide face, and the guide face extends to a bottom wall of the positioning groove.

The present invention has the following beneficial effects: the safety seat comprises a seat structure and a base, wherein the seat structure and the base are rotatably connected, and the seat structure comprises a connecting base, an adjusting assembly and a seat body; the seat body is mounted on the connecting base, and the adjusting assembly is mounted on the seat body and is selectively connected to the connecting base; and when the adjusting assembly is disengaged from the connecting base, the seat body can be disconnected from the connecting base and the base such that the rotation angle of the seat structure relative to the connecting base is adjusted and the pitch angle of the seat body relative to the connecting base is adjusted.

In this embodiment, when the adjusting assembly is disengaged from the connecting base, the rotation angle of the entire seat structure relative to the base can be adjusted and the pitch angle of the seat body relative to the connecting base can also be adjusted. The rotation angle and the pitch angle can be adjusted simultaneously in a single operation. The convenience of operation is improved and the comfort for a child during use is also improved.

BRIEF DESCRIPTION OF THE DRAWINGS

In order to more clearly describe the technical solutions of the embodiments of the present invention, the accompanying drawings required in the embodiments will be described briefly below. It should be understood that the following accompanying drawings illustrate only some embodiments of the present invention and therefore should not be construed as a limitation on the scope thereof. For a person of ordinary skill in the art, other relevant accompanying drawings can also be obtained from these accompanying drawings without any creative effort.

List of reference numerals: 100—Safety seat; 110—Adjusting assembly; 112—Connecting portion; 114—Fixing member; 1141—First fixing portion; 1143—First guide portion; 116—Elastic member; 118—Connecting housing; 119—Second guide portion; 120—Connecting base; 122—Second fixing portion; 124—Positioning member; 126—Stop portion; 127—Fixing plate; 128—Guide face; 130—Seat body; 131—Clamping member; 132—Positioning portion; 133—Clamping portion; 134—Elastic portion; 136—Abutting portion; 140—Base; 142—Clamping groove.

DETAILED DESCRIPTION OF EMBODIMENTS

In order to make the objectives, technical solutions and advantages of embodiments of the present invention clearer, the technical solutions in the embodiments of the present invention will be clearly and completely described below with reference to the accompanying drawings in the embodiments of the present invention. Obviously, the described embodiments are some of, rather than all of, the embodiments of the present invention. Generally, the assemblies of the embodiments of the present invention described and illustrated in the accompanying drawings herein may be arranged and designed in a variety of different configurations.

Therefore, the following detailed description of the embodiments of the present invention provided in the accompanying drawings is not intended to limit the scope of the present invention as claimed, but is merely representative of the selected embodiments of the present invention. On the basis of the embodiments in the present invention, all other embodiments that are obtained by a person of ordinary skill in the art without any creative effort shall fall within the scope of protection of the present invention.

It should be noted that similar reference numerals and letters indicate similar items in the following accompanying drawings. Therefore, once an item is defined in one accompanying drawing, the item does not need to be further defined and explained in subsequent accompanying drawings.

In the description of the present invention, it should be noted that the orientation or positional relationship indicated by the terms, such as "upper", "lower", "inner", "outer", is based on the orientation or positional relationship shown in the accompanying diagrams, or is the orientation or positional relationship of usual placement of the product of the present invention when in use, which is only for convenience of the description of the present invention and the simplified description, rather than indicating or implying that the devices or elements specified necessarily have a specific orientation or are constructed and operated in a specific orientation, and therefore cannot be construed as limiting the present invention.

In addition, the terms "first", "second", etc. are merely used for distinct description, and shall not be construed as indicating or implying relative importance.

It should be noted that the features in the embodiments of the present invention may be combined with each other without conflict.

Embodiment

Referring to FIG. 1-FIG. 12, this embodiment provides a safety seat 100. The safety seat 100 according to this embodiment can adjust the pitch angle and the rotation angle of the safety seat 100 simultaneously, and improve the comfort for a child during use.

The safety seat 100 according to this embodiment is mainly used to be mounted in a vehicle. When a child rides in the vehicle, the safety seat 100 can fix the child to the vehicle, thus improving the safety performance when the child rides in the vehicle.

Figure 1:
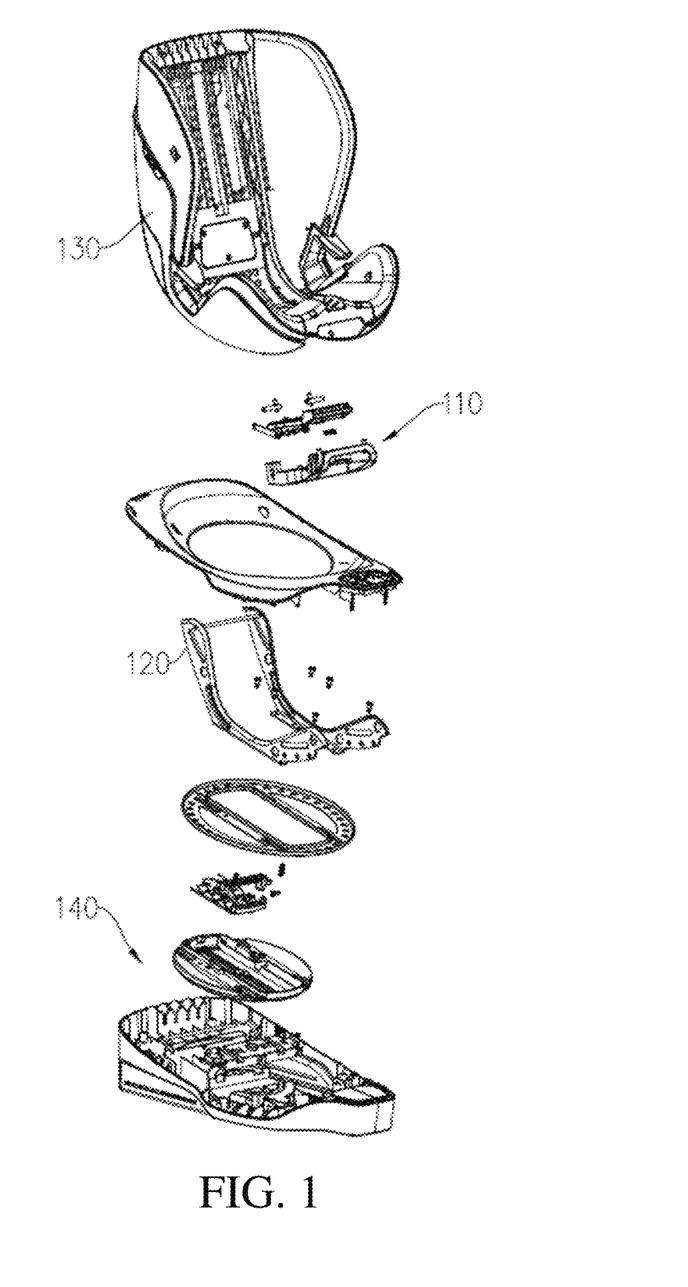
FIG. 1 is an exploded view of a safety seat according to an embodiment of the present invention.

In this embodiment, the safety seat 100 comprises: a seat structure and a base 140, the seat structure and the base 140 being rotatably connected. The seat structure comprises a connecting base 120, an adjusting assembly 110 and a seat body 130. The seat body 130 is mounted on the connecting base 120. The adjusting assembly 110 is mounted on the seat body 130 and is selectively connected to the connecting base 120. When the adjusting assembly 110 is disengaged from the connecting base 120, the seat body 130 can be disconnected from the connecting base 120 and the base 140 such that the rotation angle of the seat structure relative to the connecting base 120 is adjusted and the pitch angle of the seat body 130 relative to the connecting base 120 is adjusted. In this embodiment, when the adjusting assembly 110 is disengaged from the connecting base 120, the rotation angle of the entire seat structure relative to the base 140 can be adjusted and the pitch angle of the seat body 130 relative to the connecting base 120 can also be adjusted. The rotation angle and the pitch angle can be adjusted simultaneously in a single operation. The convenience of operation is improved and the comfort for a child during use is also improved.

In this embodiment, the adjusting assembly 110 is mounted on the seat body 130, and is selectively connected to the connecting base 120; the adjusting assembly 110 can match or be disengaged from the connecting base 120; and when the adjusting assembly 110 is disengaged from the connecting base 120, the seat body 130 can adjust the pitch angle of the seat body relative to the connecting base 120 so as to improve the comfort for a child during use.

In this embodiment, the connecting base 120 is rotatably connected to the base 140, and the connecting base 120 can drive the seat body 130 to rotate and adjust the rotation angle and the pitch angle of the seat body 130, so that the rotation angle and the pitch angle relative to another position can be adjusted when a child sits in the safety seat 100.

Generally, the base 140 is mounted on a saddle of a vehicle, and a child usually sits on the seat body 130. The rotatable connection between the connecting base 120 and the base 140 is mainly used to adjust the rotation angle of the seat body 130, and the adjusting assembly 110 is mainly configured to adjust the pitch angle of the seat body 130 relative to the saddle. When the seat body 130 is adjusted in place relative to the connecting base 120, the adjusting assembly 110 matches the connecting base 120 to fix the seat body 130 to the connecting base 120. The connecting base 120 can drive the seat body 130 to rotate relative to the base 140. That is to say, when the seat body 130 can rotate relative to the base 140 under the driving of the connecting base 120 at any pitch angle of the connecting base 120, the convenience of adjusting the entire safety seat 100 is improved.

Figure 2:
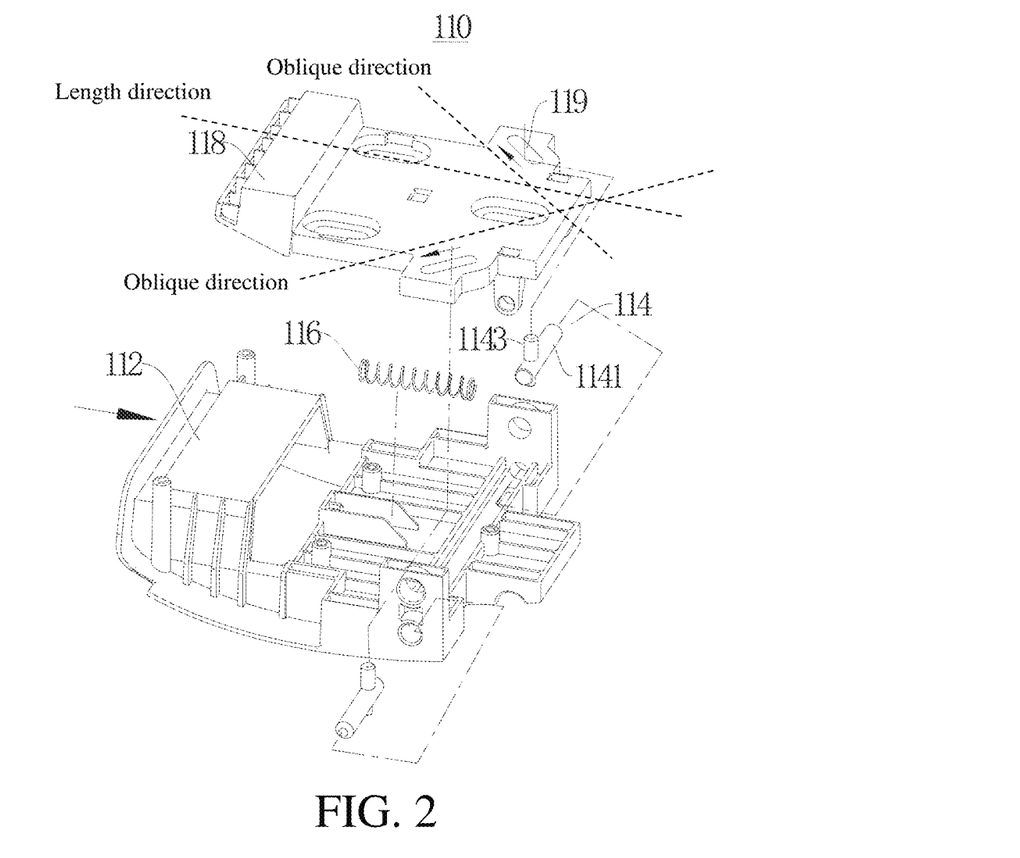
FIG. 2 is an exploded view of an adjusting assembly of a safety seat according to an embodiment of the present invention.
Figure 3:
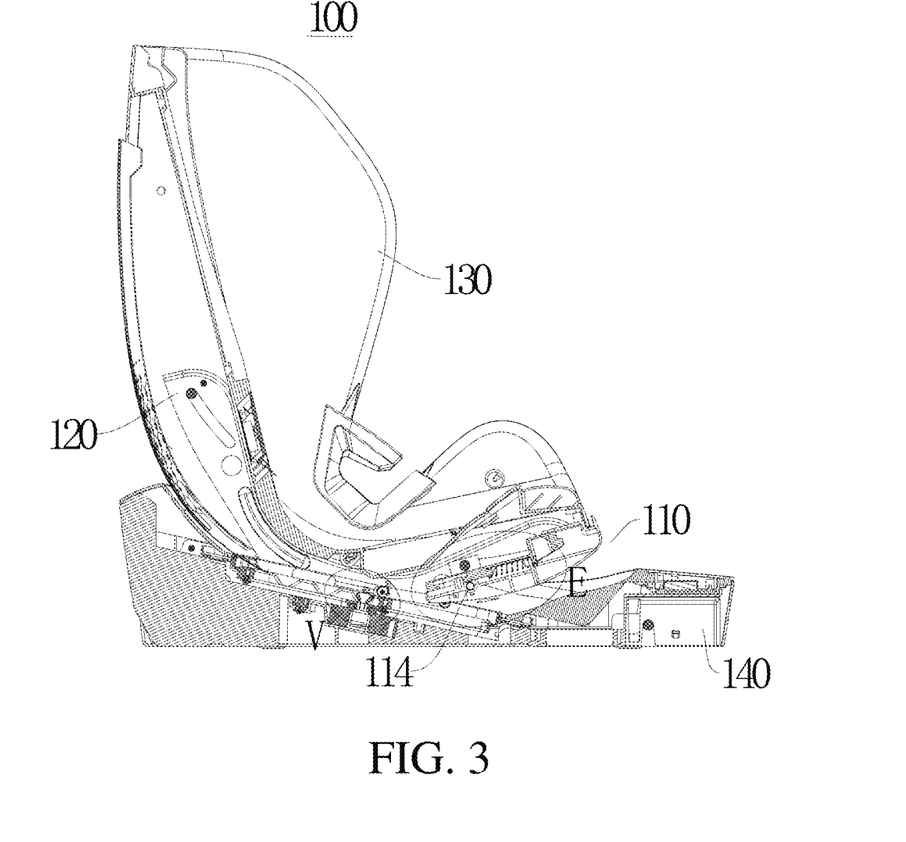
FIG. 3 is a cross-sectional view showing the matching between a fixing member and a clamping member of a safety seat according to an embodiment of the present invention.
Figure 4:
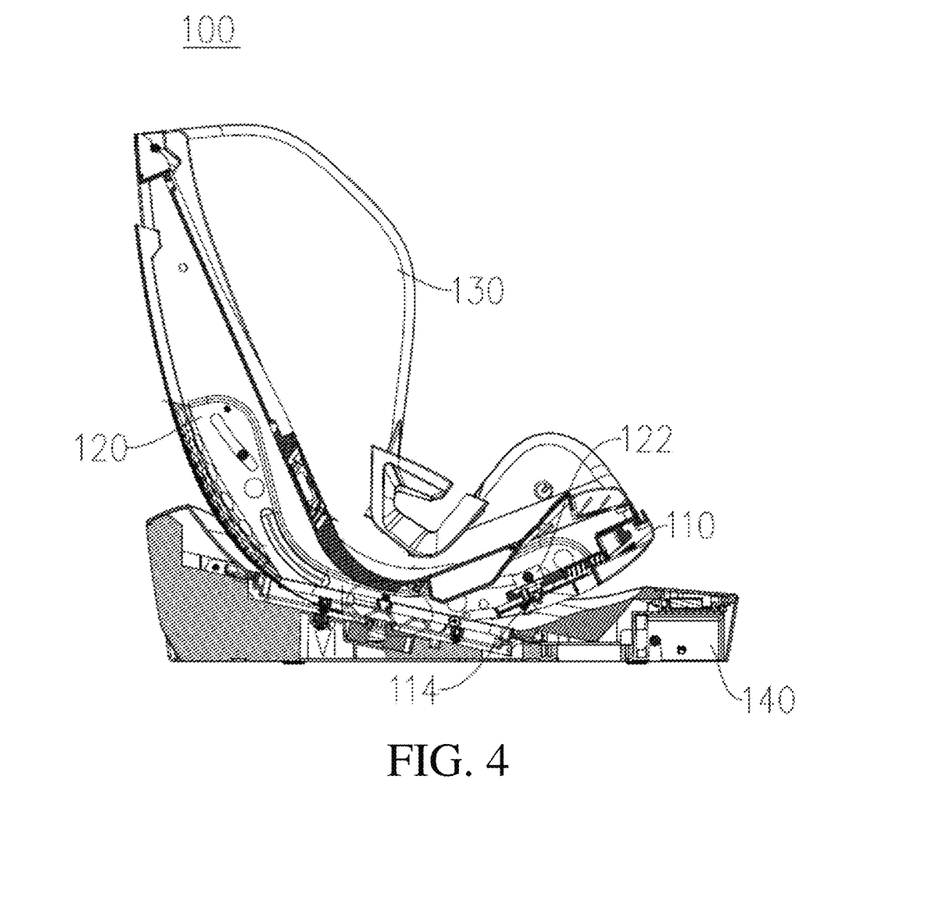
FIG. 4 is a cross-sectional view showing the sliding of a fixing member relative to a clamping member of a safety seat according to an embodiment of the present invention.

Referring to FIGS. 2, 3 and 4, in this embodiment, the adjusting assembly 110 comprises a connecting portion 112, a fixing member 114 and an elastic member 116, wherein one end of the elastic member 116 is connected to the connecting base 120, the other end thereof is connected to the fixing member 114, the fixing member 114 is fixed to the connecting portion 112, the fixing member 114 selectively matches the connecting base 120, and the connecting portion 112 is configured to drive the fixing member 114 to move away from the connecting base 120 under the action of an external force, so that the fixing member 114 is disengaged from the connecting base 120, and the seat body 130 can adjust the pitch angle of the seat body relative to the connecting base 120; and the elastic member 116 drives the fixing member 114 to move close to the connecting base 120 when the external force is removed, so that the fixing member 114 matches the connecting base 120, and the seat body 130 is fixedly connected to the connecting base 120.

In this embodiment, when the pitch angle of the seat body 130 relative to the saddle needs to be adjusted, an external force is applied to the connecting portion 112, and the connecting portion 112 drives the fixing member 114 to move in a direction away from the connecting base 120, so that the fixing member 114 is disengaged from the connecting base 120. At this time, the connecting base 120 and the seat body 130 can move relative to each other, and a user may need to adjust the pitch angle of the seat body 130 relative to the connecting base 120 and the rotatable connection of the entire seat structure relative to the base 140. After the adjustment is in place, the external force is removed, and under the action of a restoring force of the elastic member 116, the fixing member 114 moves in a direction close to the connecting base 120, so that the fixing member 114 and the connecting base 120 match each other, thereby fixing the seat body 130 to the connecting base 120, and ensuring the safety performance of the safety seat 100 during the driving of the vehicle.

In this embodiment, the fixing member 114 comprises a first fixing portion 1141, a second fixing portion 122 is arranged on the connecting base 120, and the first fixing portion 1141 selectively matches the second fixing portion 122; and when an external force is applied to the connecting portion 112, the first fixing portion 1141 is disengaged from the second fixing portion 122, and when the external force is removed, the first fixing portion 1141 matches the second fixing portion 122.

In this embodiment, the first fixing portion 1141 is a fixing post, and the second fixing portion 122 is a fixing hole formed in the connecting base 120. When the fixing post extends into the fixing hole, the connecting base 120 is fixedly connected to the seat body 130, and when the fixing post is detached from the fixing hole, the connecting base 120 and the seat body 130 can move relative to each other.

Similarly, the first fixing portion 1141 may be a fixing hole, and the second fixing portion 122 may be a fixing hole formed in the seat body 130.

It should be noted that, in this embodiment, the first fixing portion 1141 and the second fixing portion 122 match each other by means of the fixing post and the fixing hole, but the means are not limited thereto. In other embodiments of the present invention, the first fixing portion 1141 and the second fixing portion 122 may be fixedly connected by means of a buckle or by other means, and solutions equivalent to that of this embodiment fall within the scope of protection of the present invention provided that the solutions can achieve the effects of this embodiment.

In this embodiment, the fixing member 114 comprises a first guide portion 1143, the adjusting assembly 110 further comprises a connecting housing 118, the connecting housing 118 is fixedly connected to the connecting base 120, a second guide portion 119 is arranged on the connecting housing 118, the first guide portion 1143 matches the second guide portion 119, and when an external force is applied to the connecting portion 112, the first guide portion 1143 slides in an extension direction of the second guide portion 119, so that the first fixing portion 1141 moves away from the second fixing portion 122, and is disengaged from the second fixing portion 122.

In this embodiment, when the external force is applied to the connecting portion 112, the movement of the connecting portion 112 relative to the connecting base 120 drives the first guide portion 1143 to slide in the extension direction of the second guide portion 119, so that the first fixing portion 1141 gradually moves in the direction away from the second fixing portion 122. When the external force is removed, the first guide portion 1143 also moves in the extension direction of the second guide portion 119, so that the first fixing portion 1141 moves in a direction close to the second fixing portion 122 until the first fixing portion matches the second fixing portion 122.

In this embodiment, the second guide portion 119 is a guide groove provided in the connecting housing 118, the first guide portion 1143 is accommodated in the guide groove, and when the external force is applied to the connecting portion 112, the first guide portion 1143 slides in an extension direction of the guide groove, so that the first fixing portion 1141 is separated from the second fixing portion 122.

In this embodiment, the connecting housing 118 is roughly rectangular, and when the external force is applied to the connecting portion 112, the connecting portion 112 slides in a length direction of the connecting housing 118, and the guide groove is provided in a width direction of the connecting housing 118, thereby driving the first fixing portion 1141 to move in the width direction of the connecting housing 118, and disengaging the first fixing portion 1141 from the second fixing portion 122.

In this embodiment, the second guide portion 119 is arranged obliquely. The second guide portion 119 has two opposite ends, the first end is arranged close to the second fixing portion 122, and the second end is arranged away from the second fixing portion 122, wherein the first end is arranged close to the connecting portion 112, and the second end is arranged away from the connecting portion 112. When the external force is applied to the connecting portion 112, the connecting portion 112 slides in the extension direction of the connecting housing 118, and the first guide portion 1143 abuts against an inner wall of the guide groove, so that the first fixing portion 1141 moves in the direction away from the second fixing portion 122.

In this embodiment, the first fixing portion 1141 and the first guide portion 1143 are fixedly connected to each other, and the connecting portion 112 may be fixedly connected to any one of the first fixing portion 1141 and the first guide portion 1143.

Figure 5:
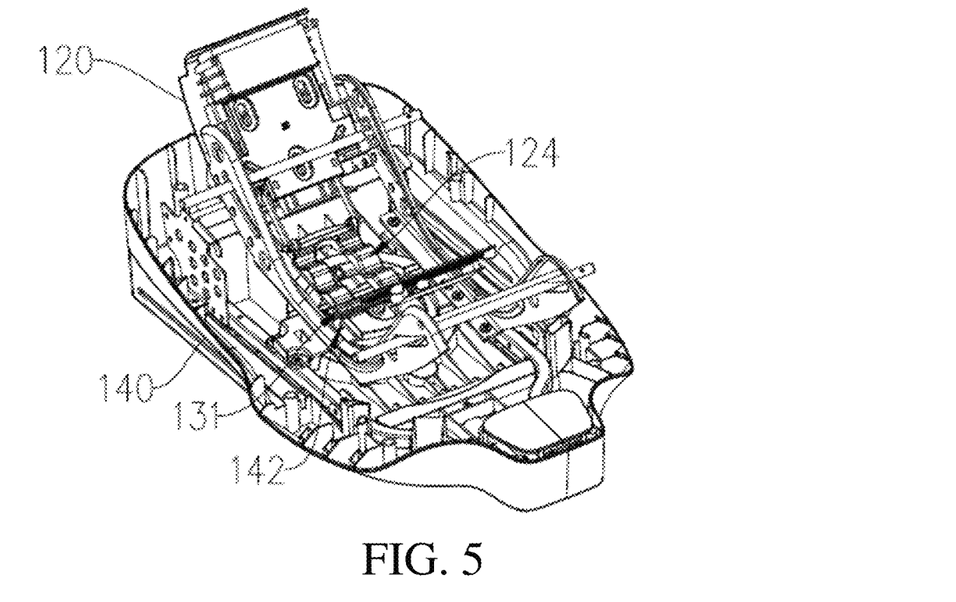
FIG. 5 is a schematic structural diagram when a seat structure of a safety seat is fixed to a base according to an embodiment of the present invention.
Figure 6:
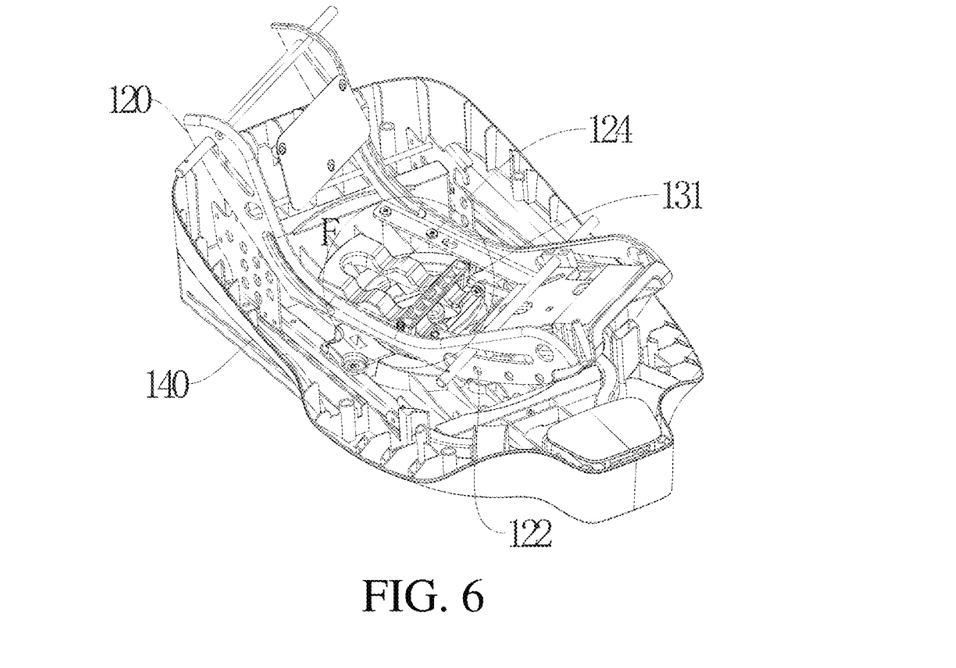
FIG. 6 is a schematic structural diagram when a seat structure of a safety seat rotates with a base according to an embodiment of the present invention.

Referring to FIGS. 5 and 6, in this embodiment, a positioning member 124 is arranged on the connecting base 120, a clamping member 131 is further arranged on the seat body 130, the positioning member 124 is connected to the clamping member 131, and the clamping member 131 is selectively fixed to the base 140; when the adjusting assembly 110 is disengaged from the connecting base 120, the positioning member 124 can drive the clamping member 131 to move relative to the connecting base 120, so that the clamping member 131 is disengaged from the base 140, and the seat structure can rotate relative to the base 140, and adjusts the pitch angle of the seat body 130 relative to the connecting base 120.

In this embodiment, when the adjusting assembly 110 is disengaged from the connecting base 120, the seat body 130 can slide relative to the connecting base 120 by pulling the adjusting assembly 110. During sliding, the positioning member 124 enables the clamping member 131 to move in the direction away from the base 140, so that the clamping member 131 is unfixed from the base 140. At this time, the entire seat structure can rotate relative to the base 140, thereby adjusting the rotation angle of the entire seat structure body relative to the connecting base 120. At the same time, during the sliding of the seat body 130 relative to the connecting base 120, the seat body 130 can adjust the pitch angle of the seat body relative to the connecting base 120.

In this embodiment, when the adjusting assembly 110 is disengaged from the connecting base 120, during the sliding of the seat body 130 relative to the connecting base 120, the entire seat structure rotates relative to the base 140 while the pitch angle relative to the connecting base 120 is adjusted, and at the same time, the rotation angle of the entire seat structure relative to the base 140 is adjusted.

Figure 7:
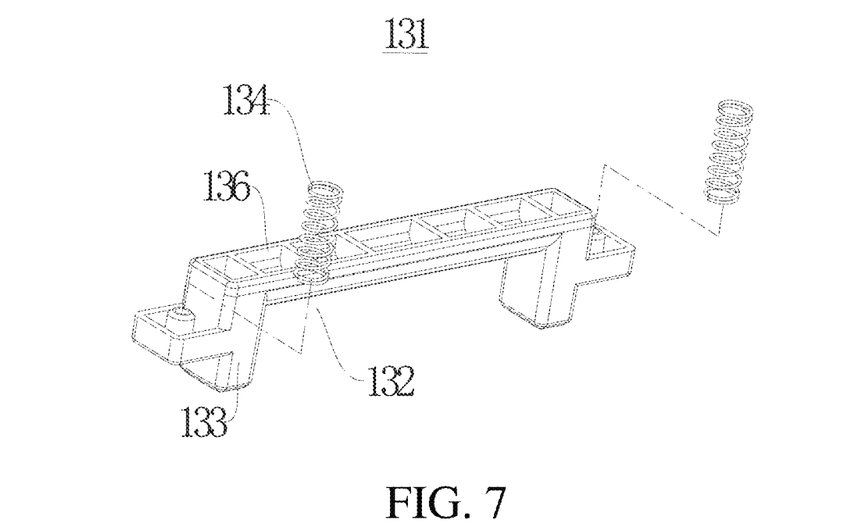
FIG. 7 is a schematic structural diagram of a clamping member of a safety seat according to an embodiment of the present invention.

Referring to FIG. 7, in this embodiment, the clamping member 131 comprises a positioning portion 132 and a clamping portion 133, the base 140 is further provided with a clamping groove 142, the positioning portion 132 matches the positioning member 124, the positioning portion 132 is fixedly connected to the clamping portion 133, and the positioning member 124 can drive the clamping portion 133 to move in a direction close to or away from the clamping groove 142 by means of the positioning portion 132, so that the clamping portion 133 matches or is disengaged from the clamping groove 142.

In this embodiment, the positioning member 124 is mounted on the connecting base 120. During the sliding of the seat body 130 relative to the connecting base 120, the positioning member 124 abuts against the positioning portion 132, so that the positioning portion 132 drives the clamping portion 133 to move in the direction away from the clamping groove 142. When the clamping portion 133 is disconnected from the clamping groove 142, the entire seat structure can rotate relative to the base 140, and the rotation angle of the seat structure relative to the base 140 is adjusted.

Figure 8:
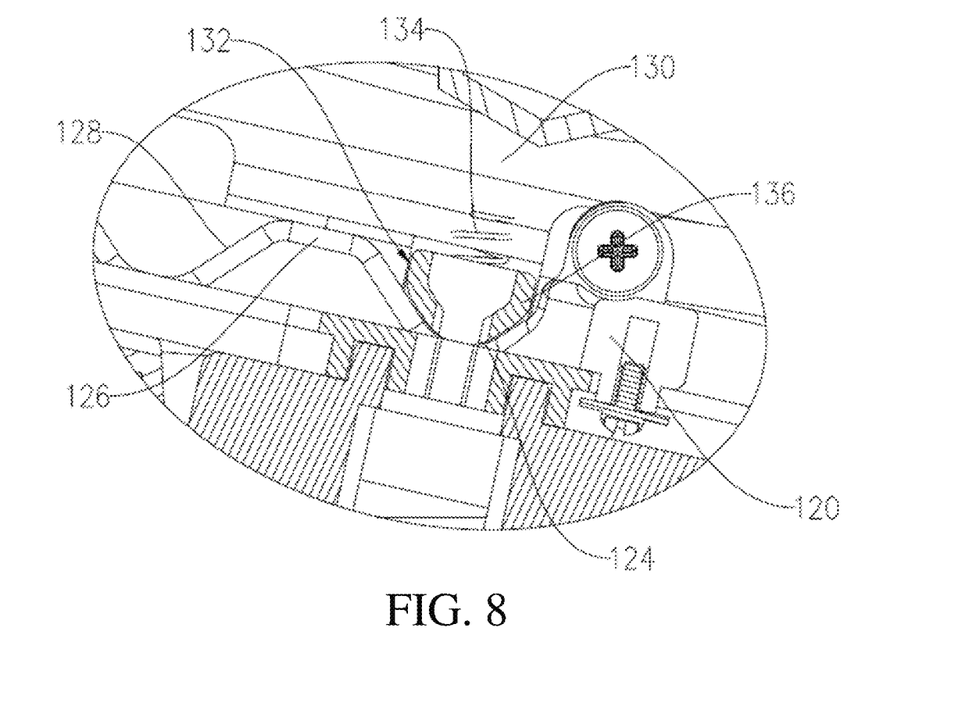
FIG. 8 is a partially enlarged view of a safety seat according to an embodiment of the present invention at a position V of FIG. 3.
Figure 9:
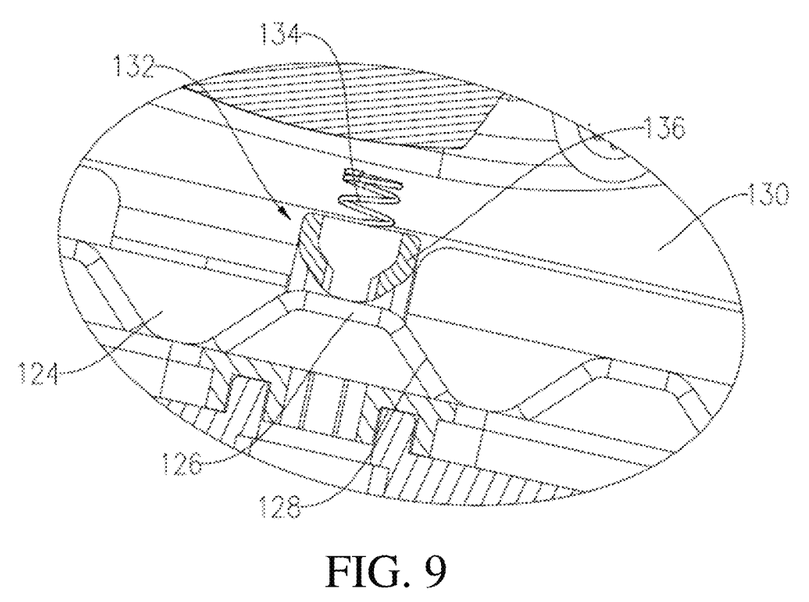
FIG. 9 is a partially enlarged view of a safety seat according to an embodiment of the present invention at a position VI of FIG. 4.
Figure 10:
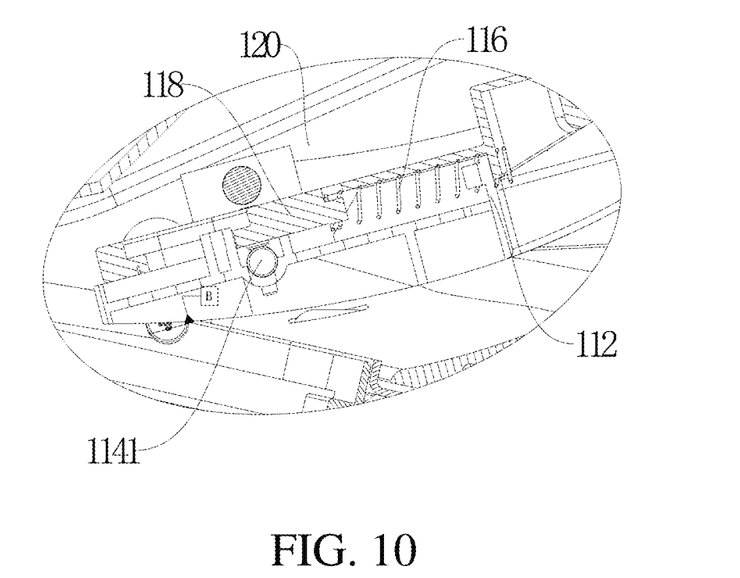
FIG. 10 is a schematic structural diagram regarding engagement between the adjusting assembly and the connecting base according to an embodiment of the present invention.
Figure 11:
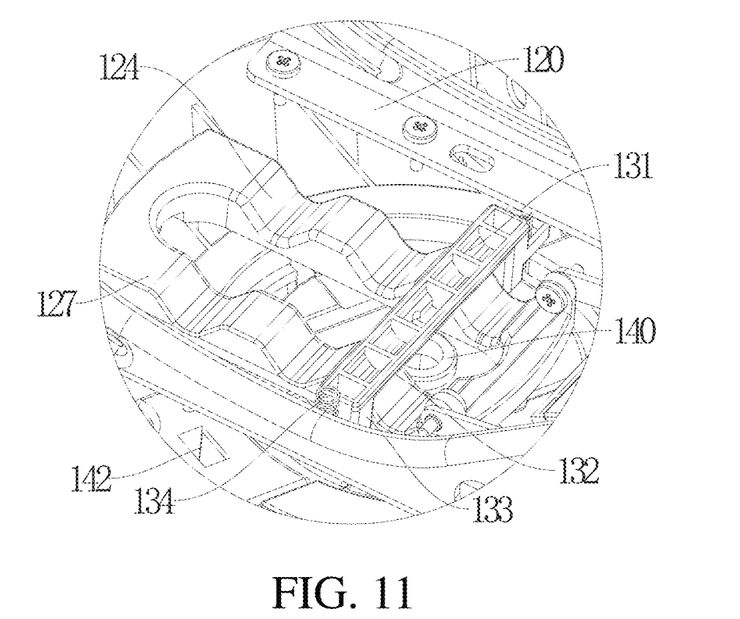
FIG. 11 is a schematic structural diagram regarding engagement between the clamping member and the base according to an embodiment of the present invention.
Figure 12:
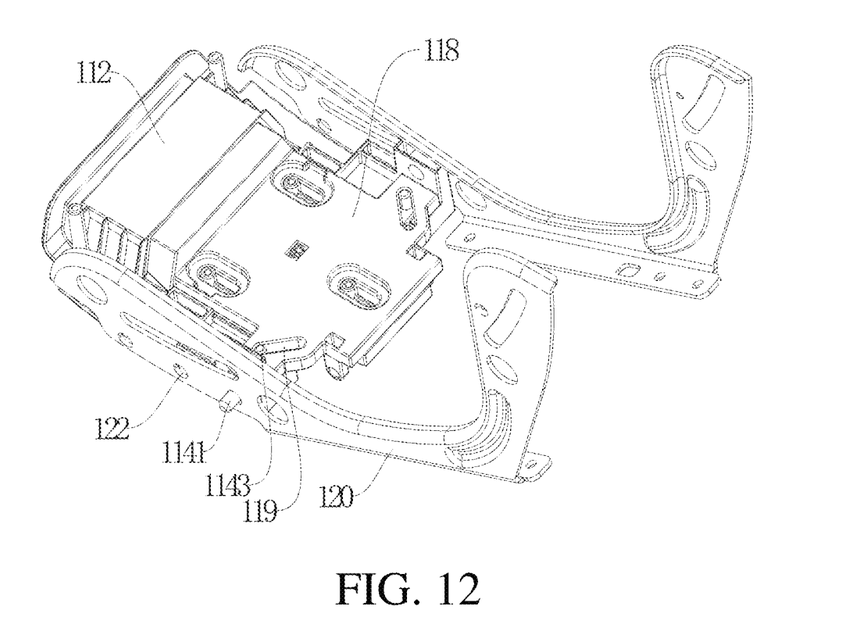
FIG. 12 is a schematic structural diagram of a Connecting base of a safety seat according to an embodiment of the present invention.

Referring to FIGS. 8 and 9, in this embodiment, the positioning member 124 comprises a fixing plate 127 and a plurality of stop portions 126 spaced on the fixing plate 127, and a positioning groove is formed between two adjacent stop portions 126; when the clamping member 131 abuts against the stop portions 126, the clamping member 131 is disconnected from the connecting base 120; and when the clamping member 131 matches the positioning groove, the clamping member 131 matches the base 140.

In this embodiment, during the sliding of the seat body 130 relative to the connecting base 120, when the positioning portion 132 slides to abut against the stop portion 126, the clamping portion 133 is disconnected from the clamping groove 142, and currently the entire seat structure can rotate relative to the base 140; and when the positioning portion 132 slides to match a positioning groove, the clamping portion 133 is fixedly connected to the clamping groove 142, so that the entire seat structure is fixedly connected to the base 140.

In this embodiment, during the sliding of the seat body 130 relative to the connecting base 120, the positioning portion 132 slides into any positioning groove and can be fixed to any positioning groove. When the positioning portion 132 slides to abut against the stop portion 126, it indicates that currently the clamping portion 133 is disconnected from the clamping groove 142, and the rotation angle of the entire seat structure relative to the base 140 can be adjusted. It can also be understood that the rotation angle can be adjusted while the pitch angle is adjusted, and one positioning groove corresponds to one pitch angle of the seat body 130 relative to the connecting base 120, that is, a larger number of stop portions 126 indicates more adjustable pitch angles of the seat body 130.

In this embodiment, the number of the clamping grooves 142 is equal to that of the positioning grooves, and the clamping grooves 142 and the positioning grooves are provided in a one-to-one correspondence manner, that is, when the positioning portion 132 is clamped into one positioning groove, the clamping portion 133 is also clamped into one clamping groove 142.

In this embodiment, each of the stop portions 126 has an obliquely arranged guide face 128, and the guide face 128 extends to a bottom wall of the positioning groove.

In this embodiment, when the pitch angle of the seat body 130 relative to the connecting base 120 is adjusted, and when the positioning portion 132 can slide from one positioning groove to another positioning groove, the guide face 128 can guide the positioning member 124, thereby reducing the resistance to the sliding of the positioning member 124 out of the clamping member 131, and improving the convenience of adjusting the pitch angle of the seat body 130.

In this embodiment, the positioning portion 132 comprises an elastic portion 134 and an abutting portion 136, wherein one end of the elastic portion 134 is connected to the clamping portion 133, the other end thereof is connected to the abutting portion 136, and the abutting portion 136 matches the clamping member 131.

In this embodiment, the positioning portion 132 comprises an elastic portion 134 and an abutting portion 136, wherein one end of the elastic portion 134 is connected to the seat body 130, the other end thereof is connected to the abutting portion 136, and the abutting portion 136 matches the positioning member 124.

In this embodiment, when the pitch angle of the seat body 130 relative to the connecting base 120 is adjusted, during the sliding of the abutting portion 136 from one positioning groove to another positioning groove, a top surface of the protruding stop portion 126 relatively abuts against the abutting portion 136 when the abutting portion 136 slides onto the stop portion 126, so that the elastic portion 134 is retracted. When the abutting portion 136 slides into the recessed positioning groove, the abutting portion 136 is quickly clamped into the positioning groove under the action of a restoring force of the elastic portion 134, and the positioning effect between the abutting portion 136 and the positioning groove is improved.

The operating principle of the safety seat 100 according to this embodiment is as follows: in this embodiment, when the pitch angle of the seat body 130 or the rotation angle of the entire seat structure relative to the base 140 needs to be adjusted, the external force is applied to the connecting portion 112, and the movement of the connecting portion 112 relative to the connecting base 120 drives the first guide portion 1143 to slide in the extension direction of the second guide portion 119, so that the first fixing portion 1141 gradually moves in the direction away from the second fixing portion 122, and the first fixing portion 1141 is disengaged from the second fixing portion 122. The seat body 130 is pushed, so that the clamping member 131 slides relative to the positioning member 124. When the abutting portion 136 slides to abut against the top surface of the stop portion 126, the rotation angle of the entire seat structure relative to the base 140 can be adjusted. When the pitch angle and the rotation angle are adjusted in place, the abutting portion 136 is clamped into the positioning groove corresponding to the pitch angle, so as to implement the positioning of the seat body 130.

After the adjustment of the pitch angle and the rotation angle is completed, the external force is removed, and the first guide portion 1143 also moves in the extension direction of the second guide portion 119, so that the first fixing portion 1141 moves in the direction close to the second fixing portion 122 until the first fixing portion matches the second fixing portion 122 to fix the seat body 130 to the connecting base 120.

In conclusion, in the safety seat 100 according to this embodiment, in this embodiment, when the adjusting assembly 110 is disengaged from the connecting base 120, the rotation angle of the entire seat structure relative to the base 140 can be adjusted and the pitch angle of the seat body 130 relative to the connecting base 120 can also be adjusted. The rotation angle and the pitch angle can be adjusted simultaneously in a single operation. The convenience of operation is improved and the comfort for a child during use is also improved.

The above merely describes specific implementations of the present invention, but the scope of protection of the present invention is not limited thereto. Any change or replacement that is readily conceivable by any person skilled in the art within the technical scope disclosed by the present invention shall fall within the scope of protection of the present invention. Therefore, the scope of protection of the present invention shall be subject to the scope of protection of the claims.

The invention claimed is:

1. A safety seat, comprising:
   a seat structure and a base (140), wherein the seat structure and the base (140) are rotatably connected, and the seat structure comprises a connecting base (120), an adjusting assembly (110) and a seat body (130);
   the seat body (130) is mounted on the connecting base (120), and
   the adjusting assembly (110) is mounted on the seat body (130) and is selectively connected to the connecting base (120); and
   when the adjusting assembly (110) is disengaged from the connecting base (120), the seat body (130) is capable of being disconnected from the connecting base (120) and the base (140) such that the rotation angle of the seat structure relative to the connecting base (120) is adjustable and the pitch angle of the seat body (130) relative to the connecting base (120) is adjustable;
   wherein the adjusting assembly (110) comprises a connecting portion (112), a fixing member (114), an elastic member (116), a substantially rectangular connecting housing (118), the connecting housing (118) is fixedly connected to the connecting base (120),
   wherein one end of the elastic member (116) is connected to the connecting base (120), the other end thereof is connected to the fixing member (114),
   the fixing member (114) is fixed to the connecting portion (112), the fixing member (114) comprises a first fixing portion (1141), a second fixing portion (122) is arranged on the connecting base (120), the first fixing portion (1141) selectively fits with the second fixing portion (122), and
   the connecting portion (112) is configured to drive the fixing member (114) to move away from the connecting base (120) under the action of an external force, so that the first fixing portion (1141) is disengaged from the second fixing portion (122), and
   the seat body (130) is capable of adjusting the pitch angle of the seat body relative to the connecting base (120) and the rotation angle of the seat structure relative to the base (140); and
   the elastic member (116) drives the fixing member (114) to move close to the connecting base (120) when the external force is removed, so that the first fixing portion (1141) fits with the second fixing portion (122), and the seat body (130) is fixedly connected to the connecting base (120);
   wherein the fixing member (114) comprises a first guide portion (1143), a second guide portion (119) is arranged on the connecting housing (118), the second guide portion (119) being a guide groove extended in an oblique direction of the connecting housing (118), wherein the guide groove is an oblique guide groove extending at an acute angle to a longitudinal axis of the connecting housing (118), the first guide portion (1143) fits with the second guide portion (119), and in response to the external force being applied to the connecting portion (112), the connecting portion (112) is configured to be slidable in a length direction of the connecting housing (118) to drive the first guide portion (1143) to slide in the oblique direction along the second guide portion (119), so that the first fixing portion (1141) moves away from the second fixing portion (122), and is disengaged from the second fixing portion (122).

2. The safety seat according to claim 1, wherein a positioning member (124) is arranged on the connecting base (120), a clamping member (131) is further arranged on the seat body (130), the positioning member (124) is connected to the clamping member (131), and the clamping member (131) is selectively fixed to the base (140); when the adjusting assembly (110) is disengaged from the connecting base (120), the positioning member (124) is capable of driving the clamping member (131) to move relative to the connecting base (120), so that the clamping member (131) is capable of being disengaged from the base (140), and when the clamping member (131) is disengaged from the base (140), the seat structure is rotatable relative to the base (140), and the pitch angle of the seat body (130) is adjustable relative to the connecting base (120).

3. The safety seat according to claim 2, wherein the clamping member (131) comprises a positioning portion (132) and a clamping portion (133), the base (140) is further provided with a clamping groove (142), the positioning portion (132) fits with the positioning member (124), the positioning portion (132) is fixedly connected to the clamping portion (133), and the positioning member (124) is capable of driving the clamping portion (133) to move in a direction close to or away from the clamping groove (142) by means of the positioning portion (132), so that the clamping portion (133) fits with or is disengaged from the clamping groove (142).

4. The safety seat according to claim 3, wherein the positioning portion (132) comprises an elastic portion (134) and an abutting portion (136), wherein one end of the elastic portion (134) is connected to the clamping portion (133), the other end thereof is connected to the abutting portion (136), and the abutting portion (136) fits with the clamping member (131).

5. The safety seat according to claim 2, wherein the positioning member (124) comprises a fixing plate (127) and a plurality of stop portions (126) spaced on the fixing plate (127), and a positioning groove is formed between two adjacent stop portions (126); when the clamping member (131) abuts against the stop portions (126), the clamping member (131) is disconnected from the connecting base (120); and when the clamping member (131) fits with the positioning groove, the clamping member (131) fits with the base (140).

6. The safety seat according to claim 5, wherein each of the stop portions (126) has an obliquely arranged guide face (128), and the guide face (128) extends to a bottom wall of the positioning groove.

* * * * *